US012730604B2

(12) United States Patent
Chen

(10) Patent No.: US 12,730,604 B2
(45) Date of Patent: Sep. 8, 2026

(54) MULTI-SOURCE AUDIO BROADCAST TO AN AUDIO SINK DEVICE

(71) Applicant: HARMAN INTERNATIONAL INDUSTRIES, INCORPORATED, Stamford, CT (US)

(72) Inventor: Mien Chin Chen, Richardson, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 37 days.

(21) Appl. No.: 18/681,947

(22) PCT Filed: Aug. 10, 2021

(86) PCT No.: PCT/US2021/045432

§ 371 (c)(1),
(2) Date: Feb. 7, 2024

(87) PCT Pub. No.: WO2023/018410

PCT Pub. Date: Feb. 16, 2023

(65) Prior Publication Data

US 2024/0394011 A1 Nov. 28, 2024

(51) Int. Cl.
*G06F 3/16* (2006.01)
*H04L 65/1083* (2022.01)
(Continued)

(52) U.S. Cl.
CPC .......... *G06F 3/165* (2013.01); *H04L 65/1086* (2013.01); *H04L 65/611* (2022.05);
(Continued)

(58) Field of Classification Search
CPC .... G06F 3/165; H04L 65/1086; H04L 65/611; H04L 67/1095; H04M 1/6066;
(Continued)

(56) References Cited

U.S. PATENT DOCUMENTS

| | | | | |
|---|---|---|---|---|
| 8,731,370 B2 * | 5/2014 | Heinmiller | ........... | H04N 21/816 386/248 |
| 11,433,311 B2 * | 9/2022 | Zimring | ................ | A63F 13/323 |

(Continued)

FOREIGN PATENT DOCUMENTS

| | | |
|---|---|---|
| EP | 1 469 659 A1 | 10/2004 |
| KR | 10-2018-0117618 A | 10/2018 |
| WO | 2021/015484 A1 | 1/2021 |

OTHER PUBLICATIONS

"Bluetooth Core Specification Revision: v5.2", Bluetooth Specification, Dec. 31, 2019, 3256 pages.

(Continued)

*Primary Examiner* — Helen Shibru
(74) *Attorney, Agent, or Firm* — Artegis Law Group, LLP

(57) ABSTRACT

One embodiment sets forth a technique for managing an audio broadcast. The technique includes transmitting first access information for a first audio stream to one or more sink devices, wherein the first access information is used by the sink device(s) to play first audio content transmitted from a first source device and the first audio content is transmitted over the first audio stream. The technique also includes receiving a first request from a second source device to transmit second audio content to the sink device(s), wherein the first request comprises second access information for a second audio stream. The technique further includes transmitting the second access information to the sink device(s), wherein the second access information is used by the sink device(s) to play the second audio content transmitted from the second source device and the second audio content is transmitted over the second audio stream.

20 Claims, 5 Drawing Sheets

(51) Int. Cl.

| | |
|---|---|
| ***H04L 65/611*** | (2022.01) |
| ***H04L 67/1095*** | (2022.01) |
| ***H04M 1/60*** | (2006.01) |
| ***H04M 1/72409*** | (2021.01) |
| ***H04R 3/14*** | (2006.01) |
| ***H04W 4/10*** | (2009.01) |
| ***H04W 4/80*** | (2018.01) |

(52) U.S. Cl.
CPC ...... *H04L 67/1095* (2013.01); *H04M 1/6066* (2013.01); *H04M 1/72409* (2021.01); *H04R 3/14* (2013.01); *H04W 4/10* (2013.01); *H04W 4/80* (2018.02)

(58) Field of Classification Search
CPC ....... H04M 1/72409; H04R 3/14; H04R 3/12; H04W 4/10; H04W 4/80; H04W 4/06
USPC .......................................................... 386/248
See application file for complete search history.

(56) References Cited

U.S. PATENT DOCUMENTS

| | | | | |
|---|---|---|---|---|
| 11,637,818 | B2 * | 4/2023 | Krohn | H04L 9/0833 713/164 |
| 12,280,314 | B2 * | 4/2025 | Zimring | A63F 13/323 |
| 12,316,618 | B2 * | 5/2025 | Krohn | H04L 63/0457 |
| 2015/0213839 | A1 * | 7/2015 | Woodman | G11B 27/105 386/248 |
| 2017/0244576 | A1 | 8/2017 | Batra et al. | |
| 2025/0260679 | A1 * | 8/2025 | Krohn | H04W 12/041 |

OTHER PUBLICATIONS

Woolley, Martin, “Bluetooth Core Specification Version 5.2 Feature Overview”, retrieved from bluetooth.com, Dec. 9, 2020, pp. 1-37.
“Audio/Video Distribution Transport Protocol Specification”, Bluetooth Specification, Revision: v1.3, Jul. 24, 2012, pp. 1-140.
“Advanced Audio Distribution”, Bluetooth Profile Specification, Revision: v1.3.2, Jan. 21, 2019, pp. 1-73.
“Hands-Free”, Bluetooth Profile Specification, Revision: v1.7.2, Jan. 21, 2019, pp. 1-134.
“Headset Profile”, Bluetooth Specification, Revision: v1.3, Dec. 18, 2008, pp. 1-27.
Afaneh Mohammad, “Intro To Bluetooth Low Energy”, The Fastest Way to Learn BLE, Featuring Bluetooth 5 and An Intro to Bluetooth Mesh, Novel Bits, 2018, 110 pages.
“Nordic Semiconductor Infocenter”, retrieved from https://infocenter.nordicsemi.com/index.jsp on Feb. 12, 2024, 1 page.
“Digital Enhanced Cordless Telecommunications (DECT);Study of Super Wideband Codec in DECT for narrowband, wideband and super-wideband audio communication including options of low delay audio connections”, ETSI TR 103 590, 2018, 40 pages.
“Telephony and Media Audio Profile”, Bluetooth Profile Specification, 2022, 38 pages.
“Hearing Access Profile”, Bluetooth Profile Specification, retrieved from https://www.bluetooth.com/specifications/hap-1-0/ on Feb. 12, 2024, 26 pages.
Basicevic et al., “An Implementation of Bluetooth Audio Video Distribution Transport Protocol”, XII Telekomunikacioni forum TELFOR 2004, 3 pages.
“Tempow True Wireless Earbuds platform”, The Wayback machine—https://web.archive.org/web20210804063652/ https://www.tempow.com/, 2019, 17 pages.

* cited by examiner

100
Broadcast Media Sender 118(1)
Source Device 106(1)
Broadcast Media Sender 118(N)
Source Device 106(N)
Broadcast Scan Assistant 114
Broadcast Media Sender 116
Host Device 110
Wireless Network 150
Broadcast Scan Delegator 112(1)
Broadcast Media Receiver 104(1)
Sink Device 102(1)
Broadcast Scan Delegator 112(M)
Broadcast Media Receiver 104(M)
Sink Device 102(M)

System Memory 204

Broadcast Scan Assistant 114

Broadcast Media Sender 116

User Interface 222

Communication Path 213

CPU 202

Memory Bridge 205

Parallel Processing Subsystem 212

Display Device 210

Communication Path 206

Input Devices 208

System Disk 214

I/O Bridge 207

Add-In Card 220

Switch 216

Add-In Card 221

Network Adapter 218

MULTI-SOURCE AUDIO BROADCAST TO AN AUDIO SINK DEVICE

CROSS-REFERENCE TO RELATED APPLICATIONS

This application is a U.S. National Stage patent application of International Patent Application No. PCT/US2021/045432, filed Aug. 10, 2021, entitled "Multi-source Audio Broadcast to an Audio Sink Device," which is incorporated herein by reference.

BACKGROUND

Field of the Various Embodiments

Embodiments of the present disclosure relate generally to wireless communication and audio streaming and, more specifically, to multi-source audio broadcast to an audio sink device using isochronous streams.

Description of the Related Art

Modern wireless communications protocols support the broadcasting of an audio stream from an audio source device to one or more audio sink devices. For example, a performance or speech could be conducted by configuring a smart microphone to operate in a Broadcast Media Sender (BMS) role defined in the Bluetooth (Bluetooth™ is a registered trademark of Bluetooth SIG, Inc.) Low Energy (LE) Audio standard. As the BMS, the smart microphone would act as an audio source device that broadcasts audio over one or more Broadcast Isochronous Streams (BISes). One or more portable speakers, headphones, and/or other audio "sink" devices could also be configured to operate in a Broadcast Media Receiver (BMR) role defined in the Bluetooth LE Audio standard. In the BMR role, each audio sink device receives the audio over one or more BISes from the smart microphone and plays the audio during the performance or speech.

However, existing wireless communications protocols limit wireless audio broadcasts to a single source device that is preselected by a user. As a result, these wireless audio broadcasts can be inconvenient or inefficient when audio is to be transmitted from multiple sources or locations. Continuing with the above example, the smart microphone would be selected by a user as the single BMS that provides audio during the performance or speech. This audio is received and played back on one or more audio sink devices operating in a BMR role during the performance or speech. To conduct a question-and-answer (Q&A) session during or after the performance or speech, the smart microphone would need to be physically passed to individual members of the audience and/or back to the performer for the audience to hear the audience members' questions and the performer's answers. Because the Q&A session is delayed or interrupted whenever the person speaking changes, the Q&A session is unable to proceed smoothly or efficiently.

As the foregoing illustrates, what is needed in the art are techniques for improving broadcast capabilities supported by audio devices and wireless communications protocols.

SUMMARY

One embodiment of the present invention sets forth a technique for managing an audio broadcast. The technique includes transmitting first access information for a first audio stream to one or more sink devices, wherein the first access information is used by the one or more sink devices to play first audio content transmitted from a first source device, the first audio content being transmitted to the one or more sink devices over the first audio stream. The technique also includes receiving a first request from a second source device to transmit second audio content to the one or more sink devices, wherein the first request comprises second access information for a second audio stream. The technique further includes transmitting the second access information to the one or more sink devices, wherein the second access information is used by the one or more sink devices to play the second audio content transmitted from the second source device, the second audio content being transmitted to the one or more sink devices over the second audio stream.

One technical advantage of the disclosed techniques relative to the prior art is that, with the disclosed techniques, the source device used to broadcast audio wirelessly to one or more sink devices can be selected or changed without releasing overall control of the sink device by a host device, in contrast to prior art approaches that limit wireless audio broadcasts to a single audio source, which is specified by a single host device that is paired with and controls the sink device. In that regard, the disclosed techniques allow wireless audio broadcasts to be conducted efficiently when audio is to be transmitted from multiple sources or locations to the same sink device. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
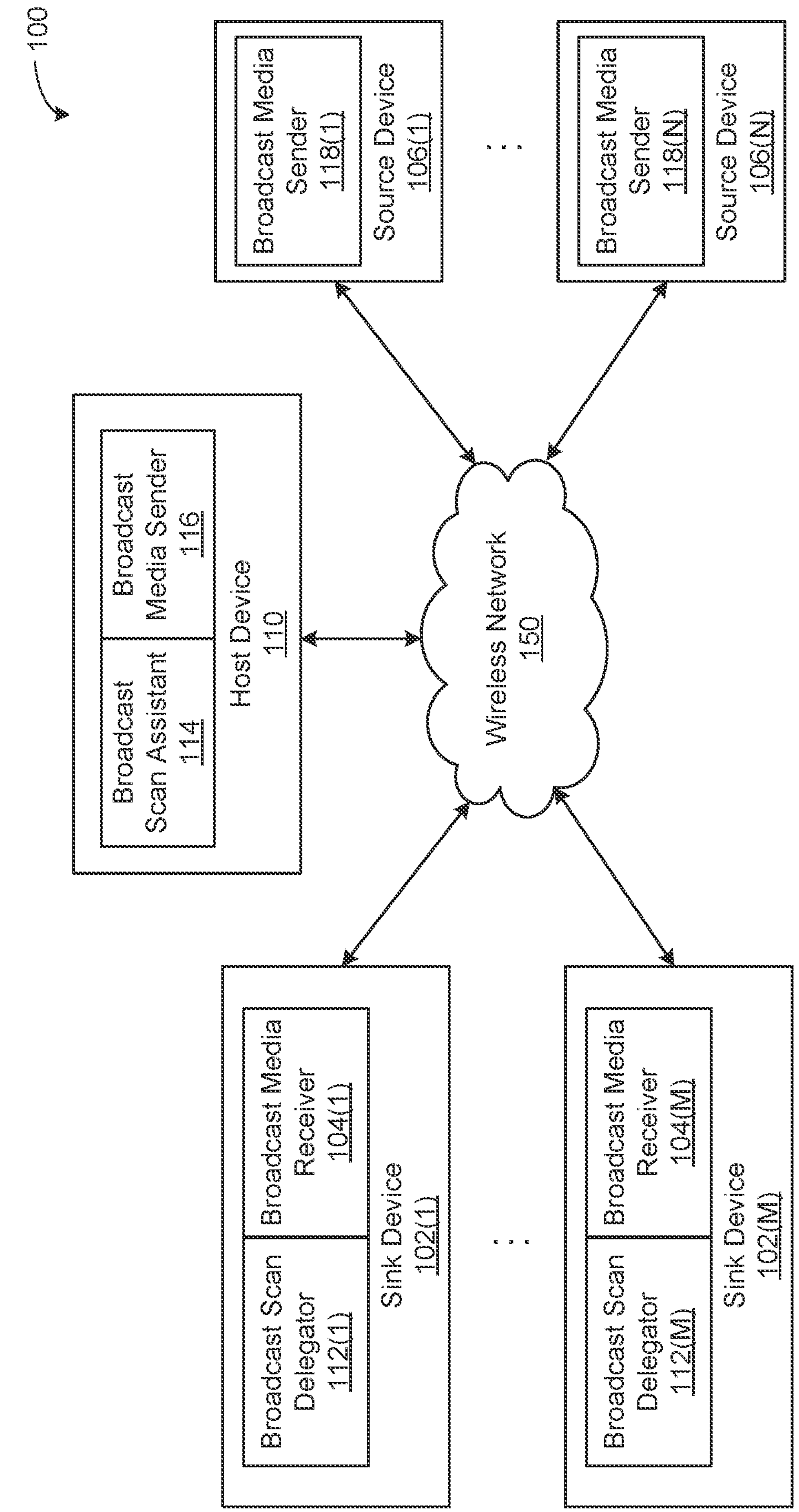
FIG. 1 illustrates a system configured to implement one or more aspects of various embodiments.

FIG. 1 illustrates a system 100 configured to implement one or more aspects of various embodiments. As shown, system 100 includes, without limitation, a host device 110, a number of source devices 106(1)-(N), a number of sink devices 102(1)-(M), and a wireless network 150. Each of source devices 106(1)-(N) is referred to individually as source device 106, and each of sink devices 102(1)-(M) is referred to individually as sink device 102.

Host device 110, source devices 106, and sink devices 102 communicate with one another over wireless network 150. For example, wireless network 150 could include a wireless local area network (WLAN), wireless personal area network (WPAN), cellular network, mesh network, Wi-Fi (Wi-Fi™ is a registered trademark of the Wi-Fi Alliance) network, Bluetooth (Bluetooth™ is a registered trademark of Bluetooth SIG, Inc.) network, and/or another type of computer network that transmits data over wireless connections.

In some embodiments, host device 110, source devices 106, and sink devices 102 use wireless network 150 to conduct an audio broadcast. During the audio broadcast, host device 110 implements or executes a broadcast scan assistant 114 that scans for audio broadcast streams on behalf of other devices, including (but not limited to) source devices 106. Host device 110 also implements or executes a broadcast media sender 116 that can transmit audio content over an audio stream to one or more receiving devices. Similarly, each of source devices 106 implements or executes a broadcast media sender 118(1)-(N) that can transmit audio content over an audio stream to one or more receiving devices, including (but not limited to) sink devices 102. Each of sink devices 102 implements or executes a broadcast media receiver 104(1)-(M) that receives and plays audio content received via an audio stream from a broadcast media sender of a transmitting device, including (but not limited to) broadcast media sender 116 of host device 110 and/or broadcast media senders 118 of one or more source devices 106. Each of sink devices 102 additionally implements or executes a broadcast scan delegator 112(1)-(M) that offloads scanning for audio streams to another device with broadcast scanning functionality, such as host device 110.

For example, host device 110, source devices 106, and sink devices 102 could use the Bluetooth LE wireless communication protocol to conduct multi-source audio broadcasts over wireless network 150. Within the Bluetooth LE protocol, broadcast scan assistant 114 could be implemented by a smartphone, smartwatch, tablet, hearing aid remote control, and/or another device that performs scanning for broadcast sources on behalf of other devices (e.g., low-powered earbuds or a headset), including (but not limited to) sink devices 102. Each of broadcast media senders 116 and 118 could be implemented by a smartphone, media player, television, laptop computer, tablet, personal computer, and/or another device that generates or transmits audio content over the Bluetooth LE protocol. Each broadcast media receiver 104 could be implemented by a set of headphones, a set of earbuds, a loud speaker, a portable speaker, a hearing aid, and/or another audio output device. The same audio output device could also implement broadcast scan delegator 112 to offload scanning for broadcast audio streams to broadcast scan assistant 114.

Further, the functionality of host device 110 can be implemented by the same device or different devices. For example, host device 110 could include a smartphone, smartwatch, tablet, personal computer, laptop computer, and/or another device that can generate a broadcast audio stream and can also scan for broadcast audio streams from other devices. In another example, broadcast scan assistant 114 could be implemented by a smartphone, smartwatch, tablet, personal computer, laptop computer, and/or another device with broadcast audio scanning functionality, and broadcast media sender 116 could be implemented by a smart microphone and/or another audio source device 106 that is paired with or connected to the device on which broadcast scan assistant 114 executes.

Figure 2:
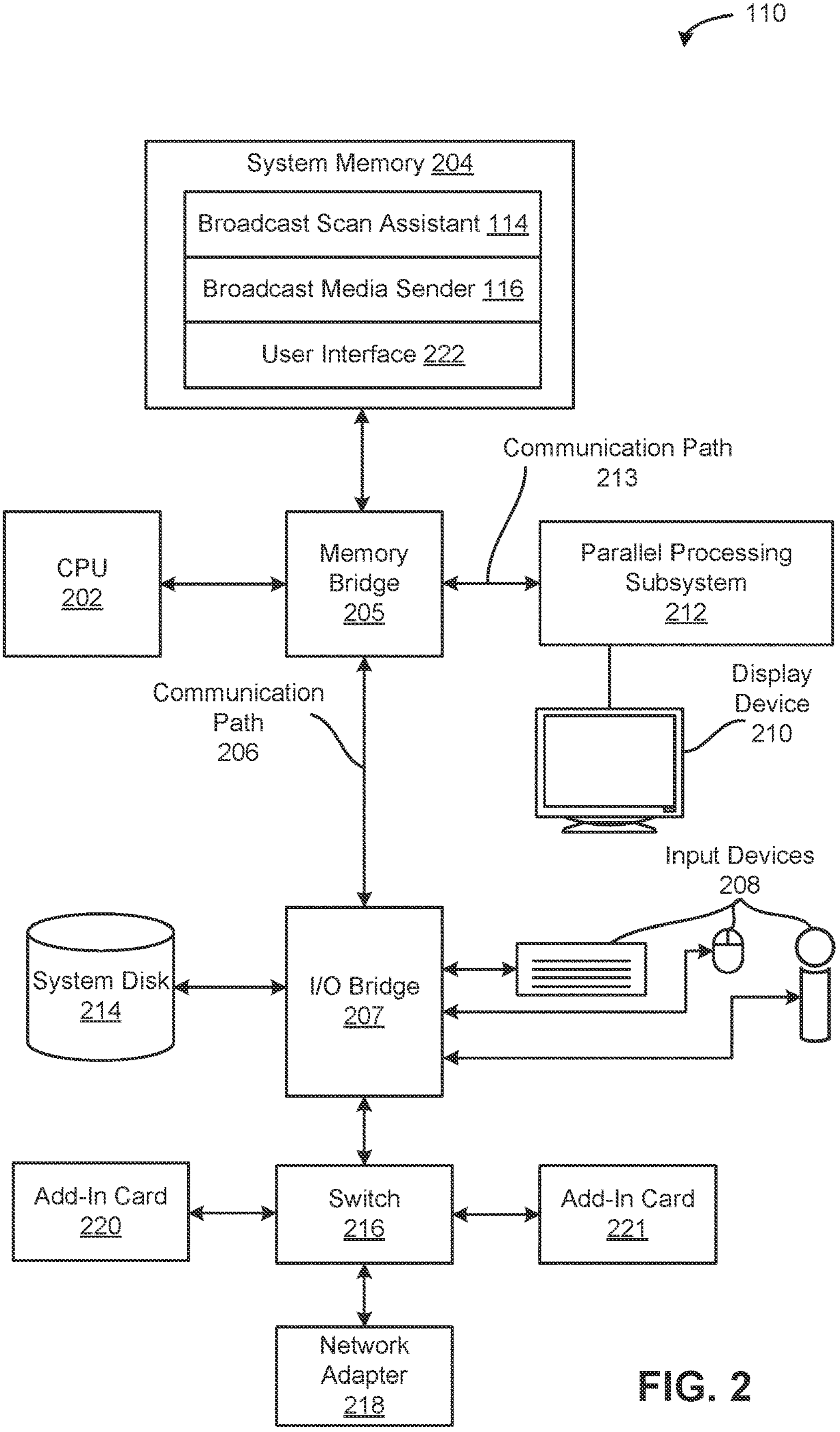
FIG. 2 is a more detailed illustration of the host device of FIG. 1, according to various embodiments.

FIG. 2 is a more detailed illustration of host device 110 of FIG. 1, according to various embodiments. It is noted that host device 110 described herein is illustrative and that any other technically feasible configurations fall within the scope of the present invention. For example, the hardware and/or software components of host device 110 could be implemented on sink device 102 and/or source device 106. In another example, the functionality of host device 110 could be distributed across multiple computing devices.

As shown, host device 110 includes, without limitation, a central processing unit (CPU) 202 and a system memory 204 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In operation, I/O bridge 207 is configured to receive user input information from input devices 208, such as a keyboard, a mouse, a touch screen, a smart microphone, and/or the like, and forward the input information to CPU 202 for processing via communication path 206 and memory bridge 205. Switch 216 is configured to provide connections between I/O bridge 207 and other components of host device 110, such as a network adapter 218 and various optional add-in cards 220 and 221.

I/O bridge 207 is coupled to a system disk 214 that may be configured to store content, applications, and data for use by CPU 202 and parallel processing subsystem 212. As a general matter, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, memory bridge 205 may be a Northbridge chip, and I/O bridge 207 may be a Southbridge chip. In addition, communication paths 206 and 213, as well as other communication paths within host device 110, may be implemented using any technically suitable protocols, including, without limitation, AGP (Accelerated Graphics Port), HyperTransport, or any other bus or point-to-point communication protocol known in the art.

In some embodiments, parallel processing subsystem 212 includes a graphics subsystem that delivers pixels to a display device 210, which may be any conventional cathode ray tube, liquid crystal display, light-emitting diode display, or the like. For example, parallel processing subsystem 212 could include a graphics processing unit (GPU) and one or more associated device drivers. The GPU could be integrated into the chipset for CPU 202, or the GPU could reside on a discrete GPU chip.

It will be appreciated that the system shown herein is illustrative and that variations and modifications are possible. The connection topology, including the number and arrangement of bridges, the number of CPUs, and the number of parallel processing subsystems, may be modified as desired. For example, system memory 204 could be connected to CPU 202 directly rather than through memory bridge 205, and other devices would communicate with system memory 204 via memory bridge 205 and CPU 202. In other alternative topologies, parallel processing subsystem 212 may be connected to I/O bridge 207 or directly to CPU 202, rather than to memory bridge 205. In still other embodiments, I/O bridge 207 and memory bridge 205 may be integrated into a single chip instead of existing as one or more discrete devices. Lastly, in certain embodiments, one or more components shown in FIG. 2 may be omitted. For example, switch 216 could be eliminated, and network adapter 218 and add-in cards 220, 221 would connect directly to I/O bridge 207. In another example, display device 210 and/or input devices 208 may be omitted.

In some embodiments, host device 110 is configured to execute or implement broadcast scan assistant 114, broadcast media sender 116, and a user interface 222 that reside in system memory 204. Broadcast scan assistant 114, broadcast media sender 116, and user interface 222 may be stored in system disk 214 and/or other storage and loaded into system memory 204 when executed.

More specifically, host device 110 is configured to conduct a multi-source audio broadcast, in which the source of broadcast audio that is received by broadcast media receivers 104 and played on the corresponding sink devices 102 can be selected or changed. For example, broadcast scan assistant 114 could initially configure sink devices 102 to play audio from broadcast media sender 116 on host device 110 during a speech, performance, or another type of event. During the event, a user could conduct a question-and-answer (Q&A) session by interacting with user interface 222 on host device 110 to select audio streams from different source devices 106 to play on sink devices 102 at different times. After a new source device 106 is selected via user interface 222, broadcast scan assistant 114 could provide access information for the audio stream generated by broadcast media sender 118 on the new source device 106 to broadcast scan delegators 112 executing on sink devices 102. Broadcast scan delegators 112 could then configure broadcast media receivers 104 executing on the corresponding sink devices 102 to play audio content received over the audio stream from the new source device 106. Consequently, the multi-source audio broadcast reduces inefficiency or manual overhead associated with broadcasting wireless audio from multiple sources or locations using conventional audio devices and wireless communications protocols, as described in further detail below.

Multi-Source Audio Broadcast

Figure 3:
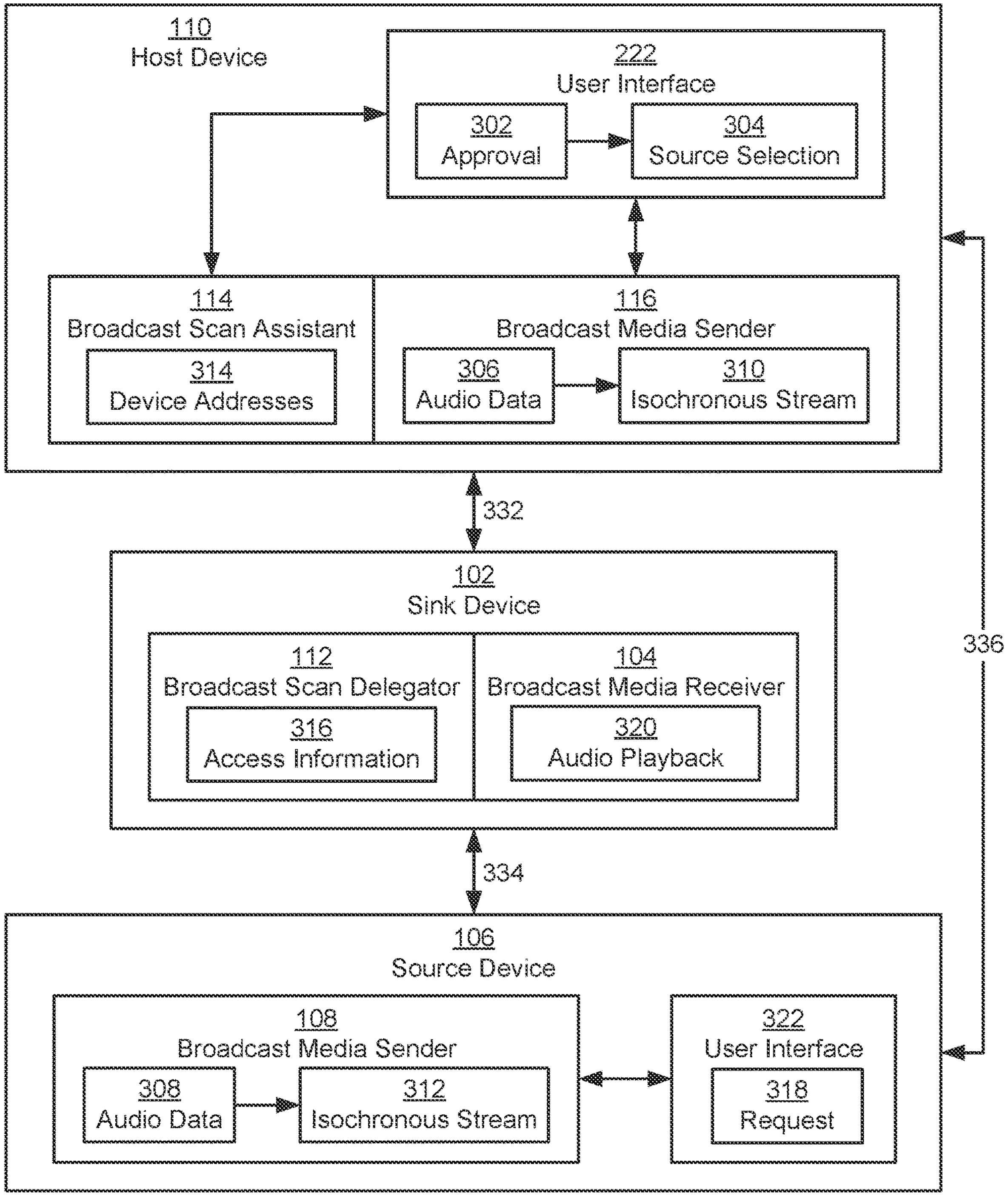
FIG. 3 illustrates the operation of the host device, sink device, and source device of FIG. 1, according to various embodiments.

FIG. 3 illustrates the operation of host device 110, sink device 102, and source device 106 of FIG. 1, according to various embodiments. As shown in FIG. 3, host device 110 includes, without limitation, broadcast scan assistant 114, broadcast media sender 116, and user interface 222; sink device 102 includes broadcast scan delegator 112 and broadcast media receiver 104; and source device 106 includes broadcast media sender 108 and a different user interface 322.

More specifically, FIG. 3 illustrates the multi-source audio broadcast functionality implemented by host device 110, sink device 102, and source device 106. Host device 110 and sink device 102 communicate via one or more channels 332, source device 106 and sink device 102 communicate via one or more channels 334, and host device 110 and source device 106 communicate via one or more channel 336.

Within host device 110, broadcast scan assistant 114 can discover broadcast scan delegator 112 on sink device 102 via an advertisement (or another type of message) from broadcast scan delegator 112. Broadcast scan assistant 114 uses network adapter 218 and an identifier (e.g., a unique identifier) for broadcast scan delegator 112 from the advertisement to establish a wireless link-layer connection over channels 332 with broadcast scan delegator 112. Broadcast scan assistant 114 then uses the link-layer connection to transmit, to broadcast scan delegator 112, device addresses 314 for one or more source devices from which broadcast audio streams are to be played.

In some embodiments, broadcast scan assistant 114 initially, or by default, transmits a device address for broadcast media sender 116 on host device 110 to broadcast scan delegator 112 over the connection with broadcast scan delegator 112. After receiving the device address (e.g., as a BD_ADDR identifier for broadcast media sender 116), broadcast scan delegator 112 and/or another component of sink device 102 listen for periodic advertisements (or messages) that include the device address over one or more broadcast channels 332. The component receives access information 316 (e.g., in a "BIGInfo" element) for host device 110 via one or more of these advertisements and/or directly from broadcast scan assistant 114 (e.g., via a Periodic Advertising Sync Transfer (PAST) procedure supported by Bluetooth LE Audio). The component then configures broadcast media receiver 104 to synchronize to an isochronous stream 310 (e.g., a Bluetooth LE Audio broadcast isochronous stream (BIS)) generated by broadcast media sender 116 on host device 110.

After broadcast media receiver 104 synchronizes to isochronous stream 310, broadcast media receiver 104 can perform audio playback 320 of audio data 306 transmitted over isochronous stream 310. For example, broadcast media receiver 104 could use a speaker on sink device 102 to output audio data 306 captured by one audio input devices on host device 110 during a presentation, speech, performance, and/or another type of event. In another example, broadcast media receiver 104 could use the speaker on sink device 102 to output audio data 306 from an audio file or track on host device 110.

Broadcast scan assistant 114 can also configure broadcast media receiver 104 to perform audio playback 320 of audio content from a different audio source, such as source device 106. As shown in FIG. 3, a user of source device 106 can interact with user interface 322 to generate a request 318 to broadcast audio from source device 106. Source device 106 can transmit request 318 to host device 110, and a user of host device 110 can interact with a separate user interface 222 on host device 110 to review request 318 and/or generate an approval 302 of request 318. After approval 302 is received via user interface 222, an application providing user interface 222 communicates, to broadcast scan assistant 114, a source selection 304 indicating that audio data 308 on source device 106 is to be played on sink device 102. Broadcast scan assistant 114 then transmits the device address of source device 106 to broadcast scan delegator 112 of sink device 102 to trigger a switch from audio playback 320 of audio data 306 transmitted over isochronous stream 310 by broadcast media sender 116 on host device 110 to audio playback 320 of audio data 308 transmitted over isochronous stream 312 by broadcast media sender 108 on source device 106.

For example, source device 106 could include a mobile phone, smart watch, tablet computer, and/or another portable electronic device used by a first user attending a presentation, speech, performance, and/or another type of event. Host device 110 could include a different mobile phone, smart watch, tablet computer, and/or another portable electronic device used by a second user speaking in, moderating, or managing the event. During a Q&A session and/or another portion of the event involving audience participation, the first user could interact with a mobile application providing user interface 322 on source device 106 to generate request 318 to broadcast audio from source device 106. Source device 106 could transmit request 318 in the form of an advertisement over one or more channels 336 to host device 110 and/or other nearby devices. After request 318 is received by host device 110, the second user could interact with a separate mobile application providing user interface 222 on host device 110 to review and generate approval 302 of request 318. The mobile application providing user interface 222 could then use approval 302 to communicate a new source selection 304 of source device 106 to broadcast scan assistant 114, and broadcast scan assistant 114 could transmit a device address for source device 106 over one or more wireless channels 332 with sink device 102.

After receiving a new device address for source device 106 from broadcast scan assistant 114, broadcast scan delegator 112 and/or another component of sink device 102 listens on one or more channels 334 for periodic advertisements that include the device address. The component receives access information 316 for source device 106 represented by the device address via one or more of these advertisements and/or directly from broadcast scan assistant 114 (e.g., via the PAST procedure). The component then configures broadcast media receiver 104 to synchronize to isochronous stream 312 generated by broadcast media sender 108 on source device 106. After broadcast media receiver 104 synchronizes to isochronous stream 312, broadcast media receiver 104 can perform audio playback 320 of audio data 308 transmitted over isochronous stream 312.

After a given audio source (e.g., host device 110, source device 106, etc.) has finished broadcasting audio data (e.g., audio data 306 and/or 308) over a corresponding isochronous stream (e.g., isochronous streams 310 and/or 312), the audio source device optionally terminates the isochronous stream to return control of the multi-source audio broadcast to broadcast scan assistant 114 on host device 110. A user of host device 110 can then interact with user interface 222 to select a different audio source from which audio data is to be played, and broadcast scan assistant 114 can communicate the device address of the selected audio source to sink device 102 to cause sink device 102 to perform audio playback 320 of audio data transmitted over a different isochronous stream by the selected audio source device. For example, broadcast media sender 108 on source device 106 could terminate isochronous stream 312 after the first user of source device 106 has finished broadcasting audio data 308 that includes a question posed by the first user during a Q&A session. The second user of host device 110 could then select host device 110 as the audio source from which audio data 306 is to be played to allow the second user to broadcast his/her answer to the question posed by the first user of source device 106.

Figure 4:
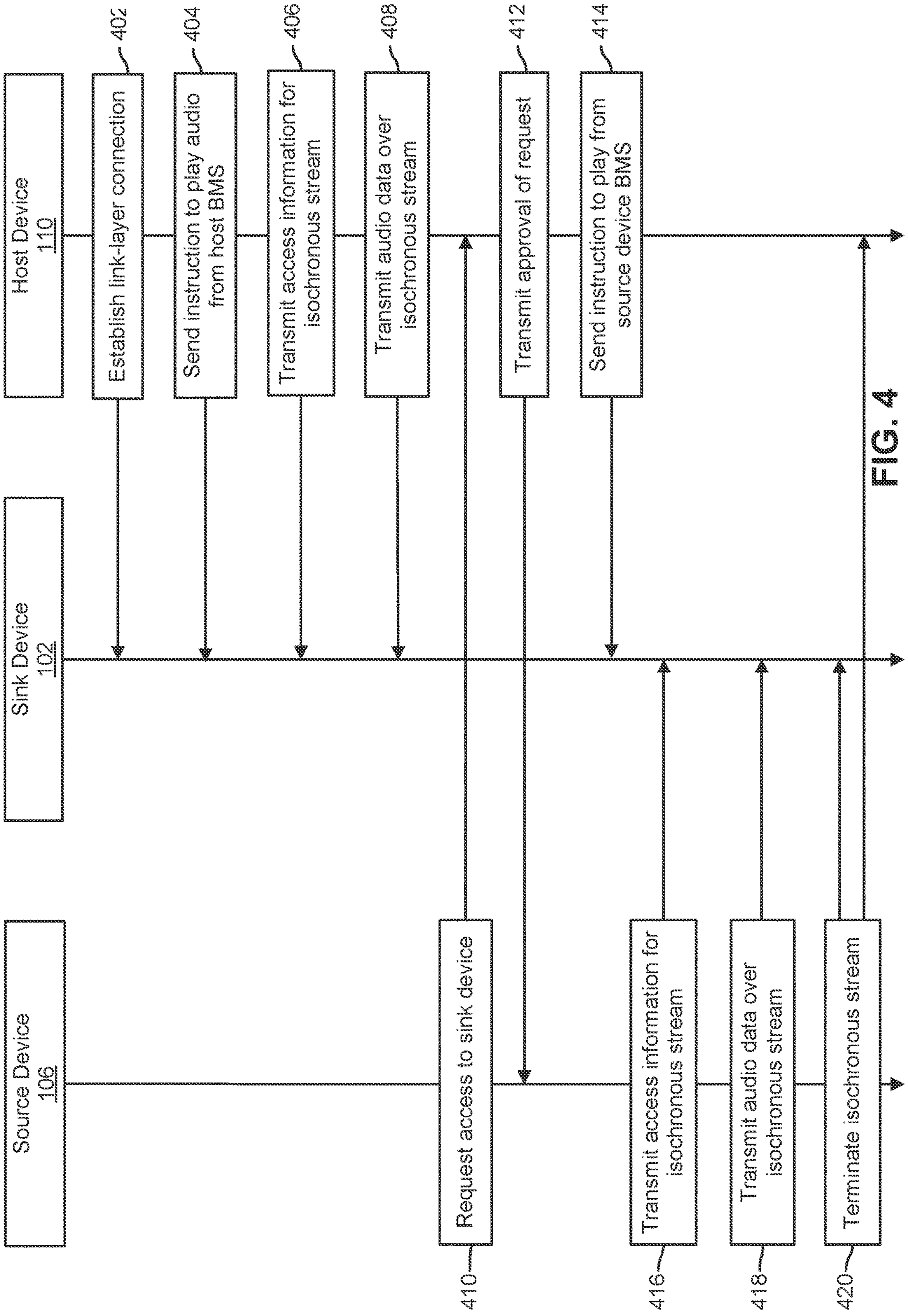
FIG. 4 illustrates an example sequence of operations performed by the host device, sink device, and source device of FIG. 1, according to various embodiments.

FIG. 4 illustrates an example sequence of operations 402-420 performed by host device 110, sink device 102, and source device 106 of FIG. 1, according to various embodiments. More specifically, FIG. 4 illustrates example operations 402-420 related to performing a multi-source audio broadcast, as implemented by host device 110, sink device 102, and source device 106. While operations 402-420 are discussed below with respect to Bluetooth LE Audio functionality, those skilled in the art will appreciate that operations 402-420 can be performed using other types of wireless communications protocols or procedures.

As shown in FIG. 4, the sequence begins with operation 402, in which host device 110 establishes a link-layer connection with sink device 102. For example, host device 110 could discover sink device 102 after receiving an extended advertisement that includes a unique identifier for sink device 102. Host device 110 could then establish the link-layer connection with sink device 102 using procedures supported by Bluetooth LE Audio.

Next, in operation 404, host device 110 sends an instruction to sink device 102 to play audio from broadcast media sender 116 on host device 110. For example, host device 110 could transmit a device address in the form of a BD_ADDR identifier for broadcast media sender 116 over the link-layer connection with sink device 102.

In operation 406, host device 110 transmits access information 316 for broadcast media sender 116 to sink device 102. For example, host device 110 could periodically transmit an advertisement with a "BIGInfo" element that includes an access code for isochronous stream 310 in an isochronous group (e.g., a broadcast isochronous group (BIG)) associated with broadcast media sender 116, timing related to the isochronous group and/or isochronous stream 310, the interval of the isochronous group, and/or other access information 316 that can be used to synchronize with isochronous stream 310. Sink device 102 could receive the advertisement, retrieve access information 316 from the advertisement, and use access information 316 to synchronize with isochronous stream 310. In another example, host device 110 could transmit access information 316 directly to sink device 102 to via a PAST link-layer procedure and sink device 102 could use access information 316 to synchronize with isochronous stream 310.

In operation 408, host device 110 transmits audio data 306 over isochronous stream 310. For example, host device 110 could establish isochronous stream 310 as a unidirectional, connectionless broadcast audio stream. Because sink device 102 is already synchronized with isochronous stream 310, sink device 102 can perform audio playback 320 of audio data 306 transmitted in operation 408. For example, sink device 102 could include a portable speaker, earbuds, hearing aid, headphones, and/or another audio output device that plays audio data 306 transmitted by host device 110 over isochronous stream 310 during an announcement, presentation, speech, performance, and/or another event with an audio component.

In one or more embodiments, host device 110 transmits audio data 306 to sink device 102 over a connected isochronous stream (CIS) instead of a broadcast isochronous stream (BIS). For example, host device 110 could perform operation 406 by transmitting, over the link-layer connection with sink device 102, a request for creating a CIS with sink device 102. Host device 110 could also transmit additional requests to other sink devices (not shown) to create separate CISes with the other sink devices. After the CIS(es) are established, host device 110 could perform operation 408 by transmitting data packets containing encoded audio data over the CIS(es) to the corresponding sink device(s). The CIS(es) maintain a synchronization reference point across multiple audio streams (e.g., with multiple sink devices) and include other parameters or mechanisms to improve link quality.

In operation 410, source device 106 transmits, to host device 110, request 318 to access sink device 102. For example, source device 106 could transmit request 318 during a Q&A session after a speech or presentation involving the playback of audio data 306 from host device 110 on sink device 102. Request 318 could be transmitted via a web interface and/or wireless connection with host device 110 after a user interacts with user interface 322 on source device 106 to generate request 318. During generation of request 318, the user could provide additional information or context related to request 318. This additional information could be included in request 318 and specify a topic of a question to be asked by the user, a summary of the question, the user's name and/or background, and/or other information that would assist a moderator of the Q&A session with reviewing request 318.

In some embodiments, the ability of source device 106 to transmit request 318 is enabled after host device 110 has finished transmitting audio data 306 over isochronous stream 310 in operation 408 (e.g., after host device 110 has terminated isochronous stream 310 and/or has otherwise indicated that transmission of audio data 306 is complete). Alternatively, source device 106 could be allowed to transmit request 318 any time after the connection with host device 110 is established, and request 318 could be "queued" with requests from other source devices (not shown) on host device 110 until operation 408 is complete.

In operation 412, host device 110 transmits approval 302 of request 318 to source device 106. For example, host device 110 could perform operation 412 after a user (e.g., a moderator of a Q&A session) has indicated approval 302 of request 318 via user interface 222. Approval 302 could additionally be received after the user has reviewed requests from one or more source devices within user interface 222.

In operation 414, host device 110 sends an instruction to sink device 102 to play audio from broadcast media sender 108 on source device 106. For example, host device 110 could transmit a device address in the form of a BD_ADDR identifier for broadcast media sender 108 over the link-layer connection with sink device 102.

In operation 416, source device 106 transmits access information 316 for isochronous stream 312 to sink device 102. For example, source device 106 could periodically transmit an advertisement with a "BIGInfo" element that includes an access code for isochronous stream 312 in an isochronous group associated with broadcast media sender 108, timing related to the isochronous group and/or isochronous stream 312, the interval of the isochronous group, and/or other access information 316 that can be used to synchronize with isochronous stream 312. Sink device 102 could receive the advertisement, retrieve access information 316 from the advertisement, and use access information 316 to synchronize with isochronous stream 312.

Alternatively, operation 416 may be omitted, and host device 110 may transmit access information 316 for source device 106 directly to sink device 102 via a PAST link-layer procedure. Sink device 102 may then use access information 316 received from host device 110 to synchronize with isochronous stream 312.

In operation 418, source device 106 transmits audio data over isochronous stream 312 to sink device 102 and/or other sink devices synchronized with the BIG associated with broadcast media sender 108. For example, source device 106 could establish isochronous stream 312 as a unidirectional, connectionless broadcast audio stream. Because sink device 102 is already synchronized with isochronous stream 312, sink device 102 can perform audio playback 320 of audio data 308 transmitted in operation 418. For example, sink device 102 could play audio data 308 transmitted by a portable source device 106 over isochronous stream 310 during a Q&A session and/or another interactive portion of an event.

Finally, in operation 420, source device 106 terminates isochronous stream 312. Continuing with the above example, broadcast media sender 108 on source device 106 could transmit, to sink device 102 and/or host device 110, an indication that isochronous stream 312 is terminated after an audience member operating source device 106 is finished asking a question or otherwise generating audio content via source device 106. After operation 420 is performed, control of sink device 102 is returned to host device 110, and the user of host device 110 can interact with user interface 222 to select a new audio source for audio content to be played on sink device 102. For example, host device could repeat operations 404-408 to select host device 110 as the audio source and configure sink device 102 to play audio data 306 from host device 110 before again approving a request from the user of another source device 106.

Figure 5:
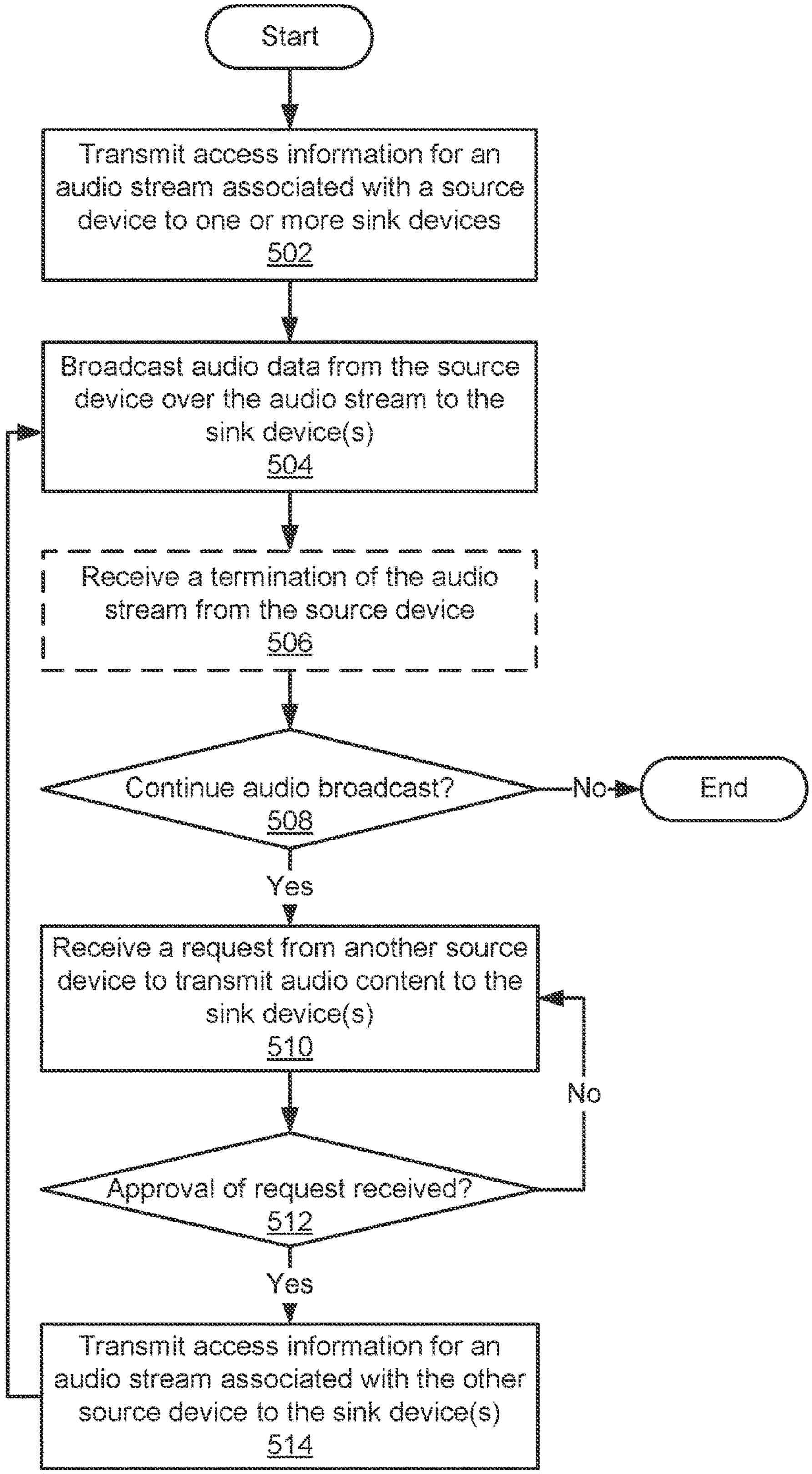
FIG. 5 is a flow diagram of method steps for managing an audio broadcast, according to various embodiments.

FIG. 5 is a flow diagram of method steps for managing an audio broadcast, according to various embodiments. Although the method steps are described in conjunction with the systems of FIGS. 1-4, persons skilled in the art will understand that any system configured to perform the method steps, in any order, is within the scope of the present invention.

As shown, at a step 502, host device 110 transmits access information for an audio stream associated with a source device to one or more sink devices. For example, host device 110 could discover each sink device via an advertisement from the sink device. Host device 110 could use a unique identifier for the sink device to establish a wireless link-layer connection with the sink device. Host device 110 could then transmit, over the link-layer connection, a device address for the source device and/or additional timing information that can be used to synchronize with a broadcast isochronous stream or connected isochronous stream from the source device. The sink device uses the device address and/or additional timing information to synchronize with the isochronous stream from the source device. After the sink device is synchronized with the audio stream, the sink device is able to receive and playback audio content transmitted by the source device over the isochronous stream.

Next, at a step 504, the source device broadcasts audio data over the audio stream to the sink device(s). Because the sink device(s) are synchronized with the audio stream, the sink device(s) can perform playback of the audio data on speakers, headphones, hearing aids, and/or other audio output devices.

As mentioned above, host device 110 may initially configure the sink device(s) to perform playback of audio content from host device 110. For example, host device 110 could transmit access information for an isochronous stream generated by a broadcast media sender on host device 110 in step 502. The sink device(s) could use the access information to synchronize with the isochronous stream and play audio content received over the isochronous stream in step 504 during a speech, performance, presentation, announcement, and/or another type of event with an audio component.

Next, at a step 506, host device 110 optionally receives a termination of the audio stream from the source device. For example, host device 110 could receive, from the source device, one or more packets indicating the end of a broadcast isochronous stream or connected isochronous stream associated with the access information. After the audio stream is terminated, host device 110 may regain control of the sink device(s). Alternatively, step 506 may be omitted, and host device 110 may manually regain control of the sink device (s) at any time (e.g., after a user interacts with a user interface on host device 110 to change the source of audio content played on the sink device(s)).

After regaining control of the sink device(s), at a step 508, host device 110 determines whether or not to continue the audio broadcast. For example, host device 110 could continue the audio broadcast if additional audio content is to be played on the sink device(s) during the event. Alternatively, host device 110 could stop the audio broadcast if no additional audio content is to be played on the sink device(s) and/or the event has concluded. If host device 110 determines that the audio broadcast is to be discontinued, host device 110 may discontinue processing related to the audio broadcast.

If host device 110 determines that the audio broadcast is to continue, at a step 510, host device 110 receives a request from another source device to transmit audio content to the sink device(s). For example, host device 110 could receive the request in the form of an advertisement from a mobile device, after a user interacts with a user interface (e.g., user interface 322) on the mobile device to generate the request. The request and/or advertisement could optionally include context related to the user and/or request, such as the name or background of the user, a name or identifier for the mobile device, a reason for the request, and/or a topic or question related to the request. In another example, host device 110 could receive a request or instruction from the user of host device 110 to retransmit audio content from host device 110 and/or from a different source device.

At a step 512, host device 110 processes the request based on receipt of an approval of the request. For example, a user interface on host device 110 (e.g., user interface 222) could display a list of requests from source devices. Within the list, each request is displayed with any corresponding context provided by the user and/or source device making the request. A user of host device 110 could interact with the user interface to review the requests within the list and generate an approval of a specific request. In another example, host device 110 could automatically generate an approval of a request when the source device from which the request was received and/or parameters of the request meet one or more conditions. If an approval of the request is not received, host device 110 does not perform additional processing related to the request.

Host device 110 may repeat steps 510-512 until a request is approved. For example, host device 110 could continue receiving requests from source devices during a Q&A session and/or another type of interactive portion of an event until a user of host device 110 approves one of the requests via the user interface on host device 110.

Once an approval of a request is received, in step 514, host device 110 transmits access information for an audio stream associated with the corresponding source device to the sink device(s). For example, host device 110 could transmit a device address, timing information, and/or other information that can be used to synchronize with the audio stream to the sink device(s). In another example, host device 110 could provide the device address of the source device to the sink device(s), and the sink device(s) could listen for advertisements that include the device address. The sink device(s) could then use additional information in the advertisements to synchronize with the audio stream. Once a sink device has synchronized with the audio stream, the sink device can play audio data transmitted over the audio stream by the source device in step 504.

Host device 110 and/or a source device from which audio data is broadcasted can additionally repeat steps 504-514 during the audio broadcast. For example, host device 110 could continue configuring the sink device(s) to play audio content from different source devices during a Q&A session and/or another interactive portion of an event. Host device 110 could then discontinue the broadcast after the final audio stream from the last source device is terminated.

In sum, the disclosed techniques provide multi-source audio broadcast functionality to one or more sink devices using isochronous streams. A host device establishes wireless connections with the sink device(s) and uses the wireless connections to configure the sink device(s) to play audio data from different source devices. To configure the sink device(s) to play audio data from a given source device, the host device can transmit a device address, timing information, and/or other access information that can be used to synchronize with an audio stream from the source device to the sink device(s). The sink device(s) use the information to wirelessly synchronize with the audio stream and play audio content received over the audio stream. After transmission of the audio content is complete, the source device and/or host device may terminate the audio stream, and control of the sink device(s) returns to the host device.

Each source device can participate in the multi-source audio broadcast by transmitting a request to broadcast audio to the host device. The host device and/or a user of the host device can review and approve individual requests from the source devices. After a request from a given source device is approved, the host device transmits access information for the audio stream generated by the source device to the sink device(s), and the sink device(s) use the access information to synchronize with the audio stream and play audio content received over the audio stream. For example, the source devices could include smart phones, smart watches, and/or other portable electronic devices operated by attendees of an event. During a Q&A session or another interactive portion of the event, the attendees could interact with user interfaces and/or mobile applications on the portable electronic devices to request access to portable speakers, headphones, ear buds, and/or other audio output devices that act as the sink devices. The requests could be received by a smart phone, tablet, smart watch, and/or another device operating as the host device, and a moderator or speaker at the event could interact with a user interface on the host device to review and approve the requests. After a request from a source device is approved, a user of the source device could transmit audio data that includes his/her voice over an isochronous stream. The sink devices could receive the audio data over the isochronous stream and play the audio data to allow other attendees of the event to hear the user's voice. After the user has finished speaking, the moderator or speaker could configure the sink devices to play audio from another source device, thereby allowing a different user to project his/her voice to the other attendees.

One technical advantage of the disclosed techniques relative to the prior art is that, with the disclosed techniques, the source device used to broadcast audio wirelessly to one or more sink devices can be selected or changed without releasing overall control of the sink device by a host device, in contrast to prior art approaches that limit wireless audio broadcasts to a single audio source, which is specified by a single host device that is paired with and controls the sink device. In that regard, the disclosed techniques allow wireless audio broadcasts to be conducted efficiently when audio is to be transmitted from multiple sources or locations to the same sink device. These technical advantages provide one or more technological improvements over prior art approaches.

1. In some embodiments, a computer-implemented method for managing an audio broadcast comprises transmitting first access information for a first audio stream to one or more sink devices, wherein the first access information is used by the one or more sink devices to play first audio content transmitted from a first source device, the first audio content being transmitted to the one or more sink devices over the first audio stream, receiving a first request from a second source device to transmit second audio content to the one or more sink devices, wherein the first request comprises second access information for a second audio stream, and transmitting the second access information to the one or more sink devices, wherein the second access information is used by the one or more sink devices to play the second audio content transmitted from the second source device, the second audio content being transmitted to the one or more sink devices over the second audio stream.
2. The computer-implemented method of clause 1, further comprising receiving a termination of the second audio stream from the second source device, receiving a second request from a third source device to transmit third audio content to the one or more sink devices, wherein the second request comprises third access information for a third audio stream over which the third audio content is transmitted, and transmitting the third access information for the third audio stream to the one or more sink devices.
3. The computer-implemented method of clauses 1 or 2, wherein the first audio stream comprises a first isochronous stream and the second audio stream comprises a second isochronous stream.
4. The computer-implemented method of any of clauses 1-3, further comprising receiving an approval of the first request prior to transmitting the second access information to the one or more sink devices.
5. The computer-implemented method of any of clauses 1-4, wherein the first request is received via an advertisement from the second source device.
6. The computer-implemented method of any of clauses 1-5, wherein the first access information comprises at least one of an address of the first source device or timing information associated with the first audio stream.
7. The computer-implemented method of any of clauses 1-6, further comprising establishing a link-layer connection with the one or more sink devices prior to transmitting the first access information.
8. The computer-implemented method of any of clauses 1-7, wherein the first access information is transmitted from the first source device to the one or more sink devices.
9. The computer-implemented method of any of clauses 1-8, wherein the first audio stream comprises at least one of a broadcast isochronous stream or a connected isochronous stream.
10. The computer-implemented method of any of clauses 1-9, wherein the one or more sink devices comprise at least one of a portable speaker, a headphone, or a mobile device.
11. In some embodiments, one or more non-transitory computer readable media store instructions that, when executed by one or more processors, cause the one or more processors to perform the steps of transmitting first access information for a first audio stream to one or more sink devices, wherein the first access information is used by the one or more sink devices to play first audio content transmitted from a first source device, the first audio content being transmitted to the one or more sink devices over the first audio stream, receiving a first request from a second source device to transmit second audio content to the one or more sink devices, wherein the first request comprises second access information for a second audio stream, and transmitting the second access information to the one or more sink devices, wherein the second access information is used by the one or more sink devices to play the second audio content transmitted from the second source device, the second audio content being transmitted to the one or more sink devices over the second audio stream.
12. The one or more non-transitory computer readable media of clause 11, wherein the instructions, when executed, further cause the one or more processors to perform the steps of receiving a termination of the second audio stream from the second source device, and retransmitting the first access information for the first audio stream to the one or more sink devices, wherein the first access information is used by the one or more sink devices to play third audio content transmitted from the first source device, the third audio content being transmitted to the one or more sink devices over the first audio stream.
13. The one or more non-transitory computer readable media of clauses 11 or 12, wherein the instructions, when executed, further cause the one or more processors to perform the step of receiving an approval of the first request prior to transmitting the second access information to the one or more sink devices.
14. The one or more non-transitory computer readable media of any of clauses 11-13, wherein the first audio stream comprises a connected isochronous stream and the second audio stream comprises a broadcast isochronous stream.
15. The one or more non-transitory computer readable media of any of clauses 11-14, wherein the first access information comprises at least one of an address of the first source device or timing information associated with the first audio stream.
16. The one or more non-transitory computer readable media of any of clauses 11-15, wherein the first request comprises a context associated with a user of the second source device.
17. The one or more non-transitory computer readable media of any of clauses 11-16, wherein the first request is received from a mobile application on the second source device.
18. The one or more non-transitory computer readable media of any of clauses 11-17, wherein the one or more sink devices comprise at least one of a portable speaker, a headphone, or a mobile device.
19. The one or more non-transitory computer readable media of any of clauses 11-18, wherein the first source device comprises at least one of a smart microphone, a mobile phone, a tablet computer, a personal computer, a laptop computer, a media player, a smartwatch, or a television.
20. In some embodiments, a system comprises a memory that stores instructions, and a processor that is coupled to the memory and, when executing the instructions, is configured to transmit first access information for a first audio stream to one or more sink devices, wherein the first access information is used by the one or more sink devices to play first audio content transmitted from a first source device, the first audio content being transmitted to the one or more sink devices over the first audio stream, receive a first request from a second source device to transmit second audio content to the one or more sink devices, wherein the first request comprises second access information for a second audio stream, and transmit the second access information to the one or more sink devices, wherein the second access information is used by the one or more sink devices to play the second audio content transmitted from the second source device, the second audio content being transmitted to the one or more sink devices over the second audio stream.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing an audio broadcast, the method comprising:

transmitting first access information for a first audio stream to one or more sink devices, wherein the first access information is used by the one or more sink devices to play first audio content transmitted from a first source device, the first audio content being transmitted to the one or more sink devices over the first audio stream;

receiving, at a host device, a first request from a second source device to transmit second audio content to the one or more sink devices, wherein the first request comprises second access information for a second audio stream; and transmitting the second access information from the host device to the one or more sink devices, wherein the second access information is used by the one or more sink devices to play the second audio content transmitted from the second source device, the second audio content being transmitted to the one or more sink devices over the second audio stream.

2. The computer-implemented method of claim 1, further comprising:

receiving a termination of the second audio stream from the second source device;

receiving a second request from a third source device to transmit third audio content to the one or more sink devices, wherein the second request comprises third access information for a third audio stream over which the third audio content is transmitted; and transmitting the third access information for the third audio stream to the one or more sink devices.

3. The computer-implemented method of claim 1, wherein the first audio stream comprises a first isochronous stream and the second audio stream comprises a second isochronous stream.

4. The computer-implemented method of claim 1, further comprising receiving an approval of the first request prior to transmitting the second access information to the one or more sink devices.

5. The computer-implemented method of claim 1, wherein the first request is received via an advertisement from the second source device.

6. The computer-implemented method of claim 1, wherein the first access information comprises at least one of an address of the first source device or timing information associated with the first audio stream.

7. The computer-implemented method of claim 1, further comprising establishing a link-layer connection with the one or more sink devices prior to transmitting the first access information.

8. The computer-implemented method of claim 1, wherein the first access information is transmitted from the first source device to the one or more sink devices.

9. The computer-implemented method of claim 1, wherein the first audio stream comprises at least one of a broadcast isochronous stream or a connected isochronous stream.

10. The computer-implemented method of claim 1, wherein the one or more sink devices comprise at least one of a portable speaker, a headphone, or a mobile device.

11. One or more non-transitory computer readable media storing instructions that, when executed by one or more processors, cause the one or more processors to perform the steps of:

transmitting first access information for a first audio stream to one or more sink devices, wherein the first access information is used by the one or more sink devices to play first audio content transmitted from a first source device, the first audio content being transmitted to the one or more sink devices over the first audio stream;

receiving, at a host device, a first request from a second source device to transmit second audio content to the one or more sink devices, wherein the first request comprises second access information for a second audio stream; and transmitting the second access information from the host device to the one or more sink devices, wherein the second access information is used by the one or more sink devices to play the second audio content transmitted from the second source device, the second audio content being transmitted to the one or more sink devices over the second audio stream.

12. The one or more non-transitory computer readable media of claim 11, wherein the instructions, when executed, further cause the one or more processors to perform the steps of:

receiving a termination of the second audio stream from the second source device; and retransmitting the first access information for the first audio stream to the one or more sink devices, wherein the first access information is used by the one or more sink devices to play third audio content transmitted from the first source device, the third audio content being transmitted to the one or more sink devices over the first audio stream.

13. The one or more non-transitory computer readable media of claim 11, wherein the instructions, when executed, further cause the one or more processors to perform the step of receiving an approval of the first request prior to transmitting the second access information to the one or more sink devices.

14. The one or more non-transitory computer readable media of claim 11, wherein the first audio stream comprises a connected isochronous stream and the second audio stream comprises a broadcast isochronous stream.

15. The one or more non-transitory computer readable media of claim 11, wherein the first access information comprises at least one of an address of the first source device or timing information associated with the first audio stream.

16. The one or more non-transitory computer readable media of claim 11, wherein the first request comprises a context associated with a user of the second source device.

17. The one or more non-transitory computer readable media of claim 11, wherein the first request is received from a mobile application on the second source device.

18. The one or more non-transitory computer readable media of claim 11, wherein the one or more sink devices comprise at least one of a portable speaker, a headphone, or a mobile device.

19. The one or more non-transitory computer readable media of claim 11, wherein the first source device comprises at least one of a smart microphone, a mobile phone, a tablet computer, a personal computer, a laptop computer, a media player, a smartwatch, or a television.

20. A system, comprising:

a memory that stores instructions, and a processor that is coupled to the memory and, when executing the instructions, is configured to:

transmit first access information for a first audio stream to one or more sink devices, wherein the first access information is used by the one or more sink devices to play first audio content transmitted from a first source device, the first audio content being transmitted to the one or more sink devices over the first audio stream;

receive, at a host device, a first request from a second source device to transmit second audio content to the one or more sink devices, wherein the first request comprises second access information for a second audio stream; and transmit the second access information from the host device to the one or more sink devices, wherein the second access information is used by the one or more sink devices to play the second audio content transmitted from the second source device, the second audio content being transmitted to the one or more sink devices over the second audio stream.

* * * * *